(12) United States Patent
Miyazaki et al.

(10) Patent No.: US 10,992,851 B2
(45) Date of Patent: Apr. 27, 2021

(54) IMAGE PROCESSING APPARATUS, IMAGE PROCESSING METHOD, AND NON-TRANSITORY COMPUTER-READABLE STORAGE MEDIUM, WITH IMAGE PROCESSING BASED ON IMAGE PROCESSING CONDITION AND INFORMATION EQUIVALENT TO DISTANCE FROM FOCAL PLANE

(71) Applicant: CANON KABUSHIKI KAISHA, Tokyo (JP)

(72) Inventors: Shinichi Miyazaki, Kawasaki (JP); Yumi Yanai, Yokohama (JP); Yuji Akiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 16/263,158

(22) Filed: Jan. 31, 2019

(65) Prior Publication Data

US 2019/0253609 A1    Aug. 15, 2019

(30) Foreign Application Priority Data

Feb. 15, 2018 (JP) .............................. JP2018-025349
Nov. 28, 2018 (JP) .............................. JP2018-222691

(51) Int. Cl.
*H04N 5/232* (2006.01)
*G06T 7/50* (2017.01)
*G02B 30/00* (2020.01)

(52) U.S. Cl.
CPC ......... *H04N 5/23212* (2013.01); *G02B 30/00* (2020.01); *G06T 7/50* (2017.01); *H04N 5/23229* (2013.01)

(58) Field of Classification Search
CPC .. H04N 5/23212; H04N 5/23229; G06T 7/50; G02B 30/00
See application file for complete search history.

(56) References Cited

U.S. PATENT DOCUMENTS 9,324,153 B2     4/2016  Komatsu
2013/0300860 A1  11/2013 Komatsu
2016/0065924 A1* 3/2016  Yokoyama ......... H04N 5/23212
                                         348/241

FOREIGN PATENT DOCUMENTS

JP    2008-015754 A    1/2008
JP    2009-251839 A    10/2009
JP    2013-253964 A    12/2013

* cited by examiner

*Primary Examiner* — Nicholas G Giles
(74) *Attorney, Agent, or Firm* — Venable LLP

(57) ABSTRACT

According to an embodiment of the present invention, an image processing apparatus capable of properly controlling sharpness of an output image and outputting the image is provided. More specifically, the image processing apparatus comprises: a setting unit configured to set an image processing condition for performing image processing to image data of an input photographic image based on an output characteristic of an output apparatus that influences sharpness of an image output from the output apparatus; an obtaining unit configured to obtain information equivalent to a distance from a focal plane in the photographic image; and an image processing unit configured to perform image processing to the image data based on the information obtained by the obtaining unit and the image processing condition set by the setting unit.

39 Claims, 13 Drawing Sheets

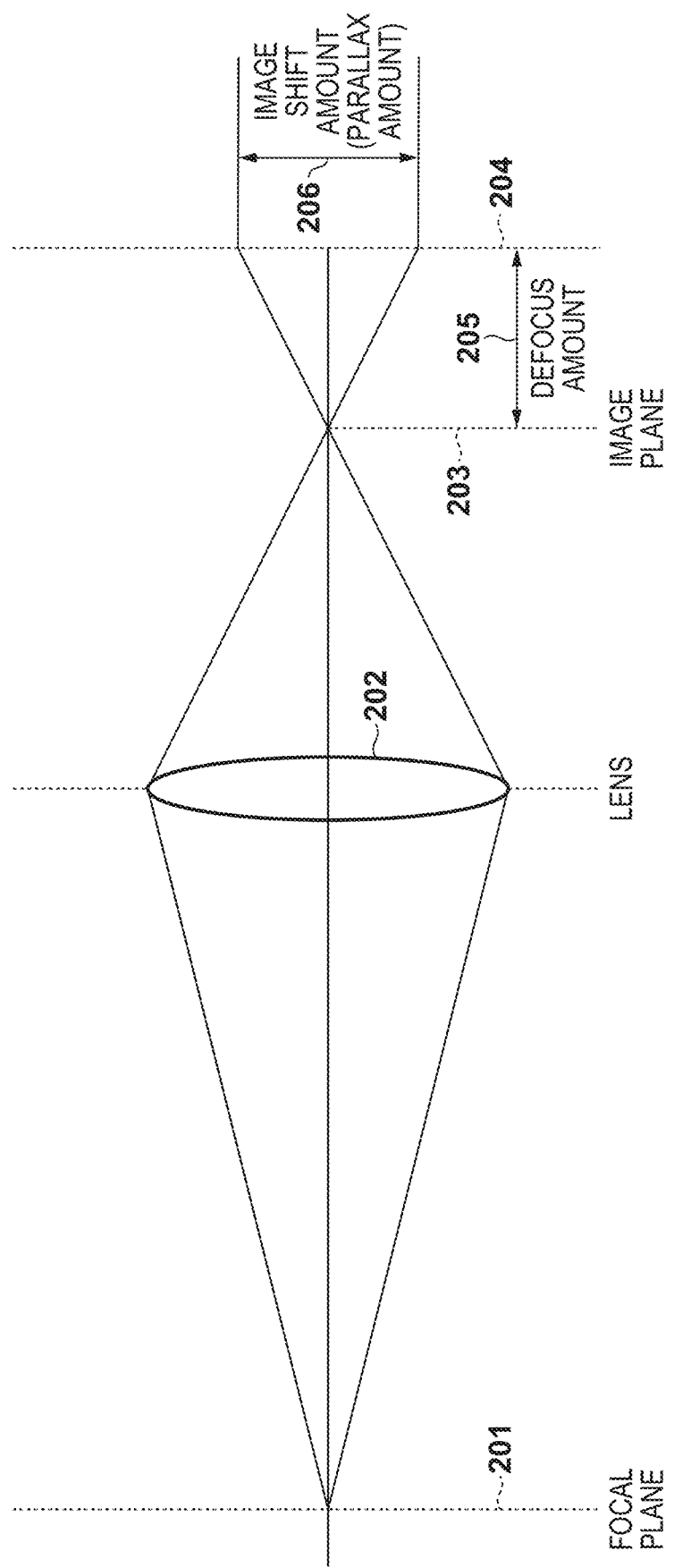

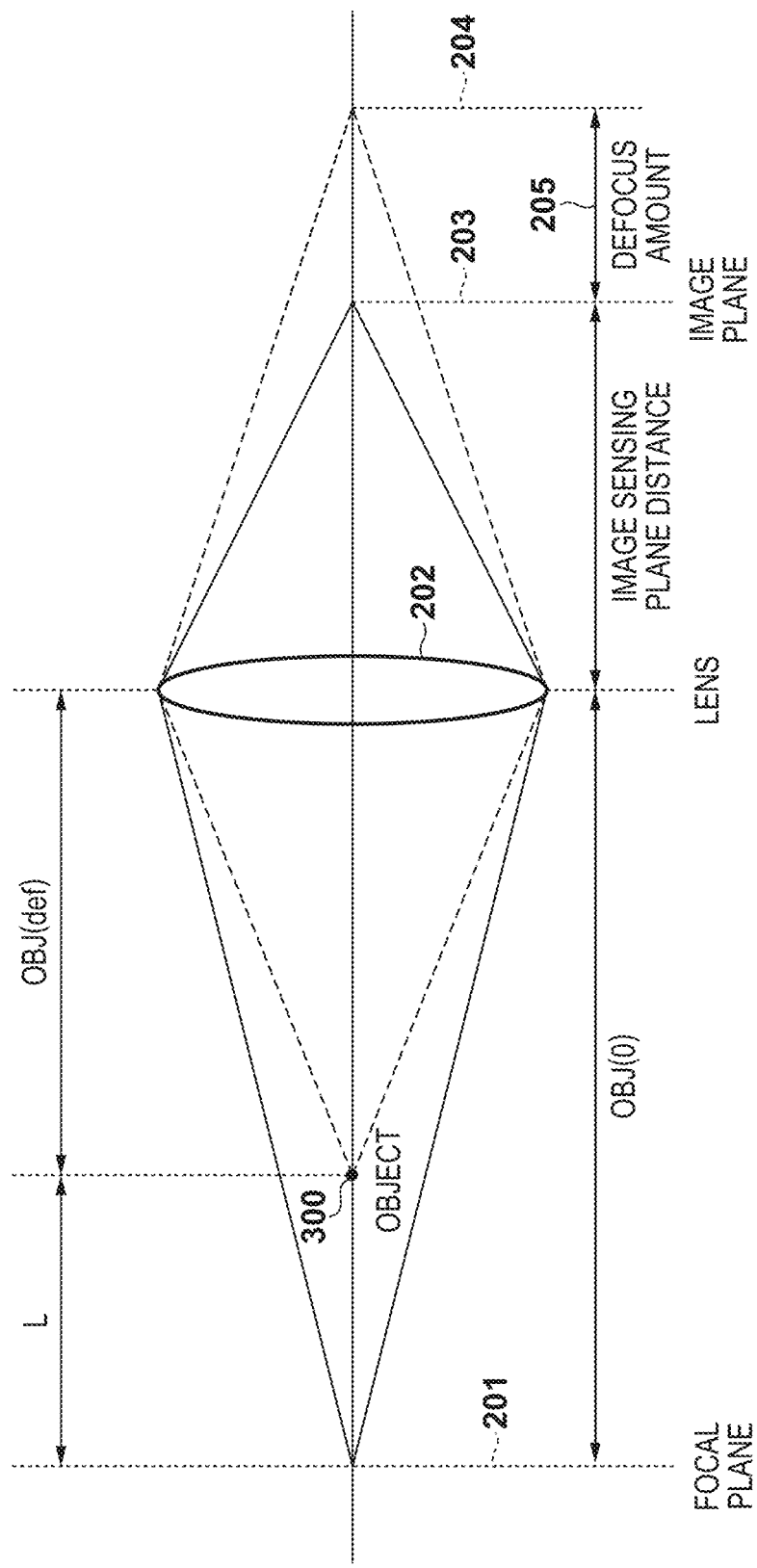

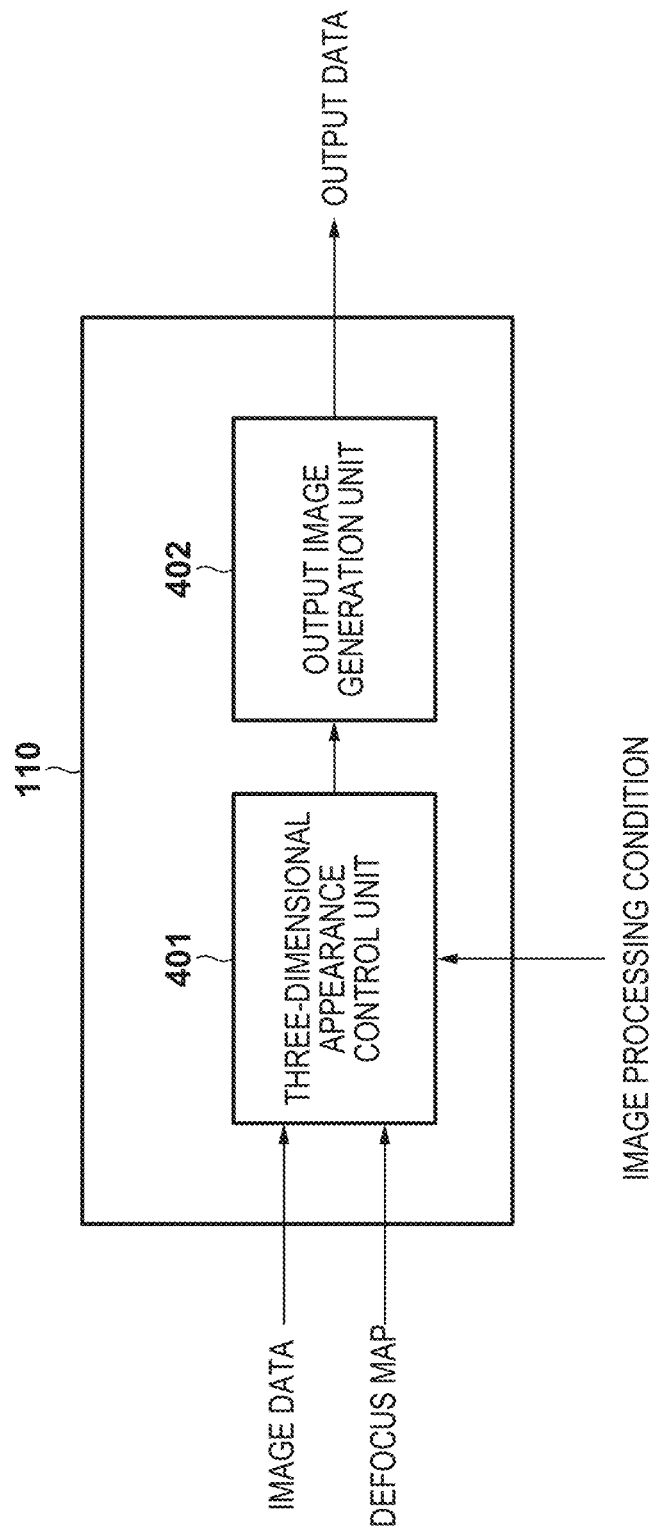

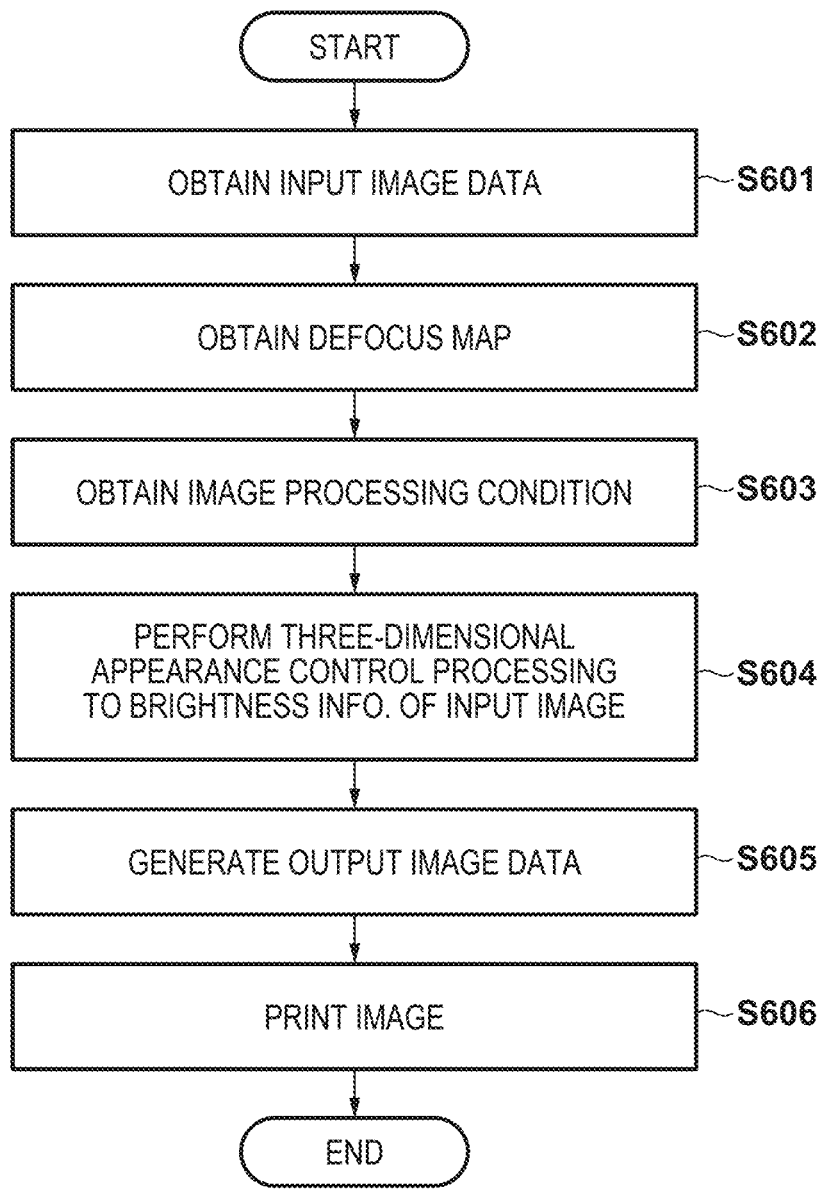

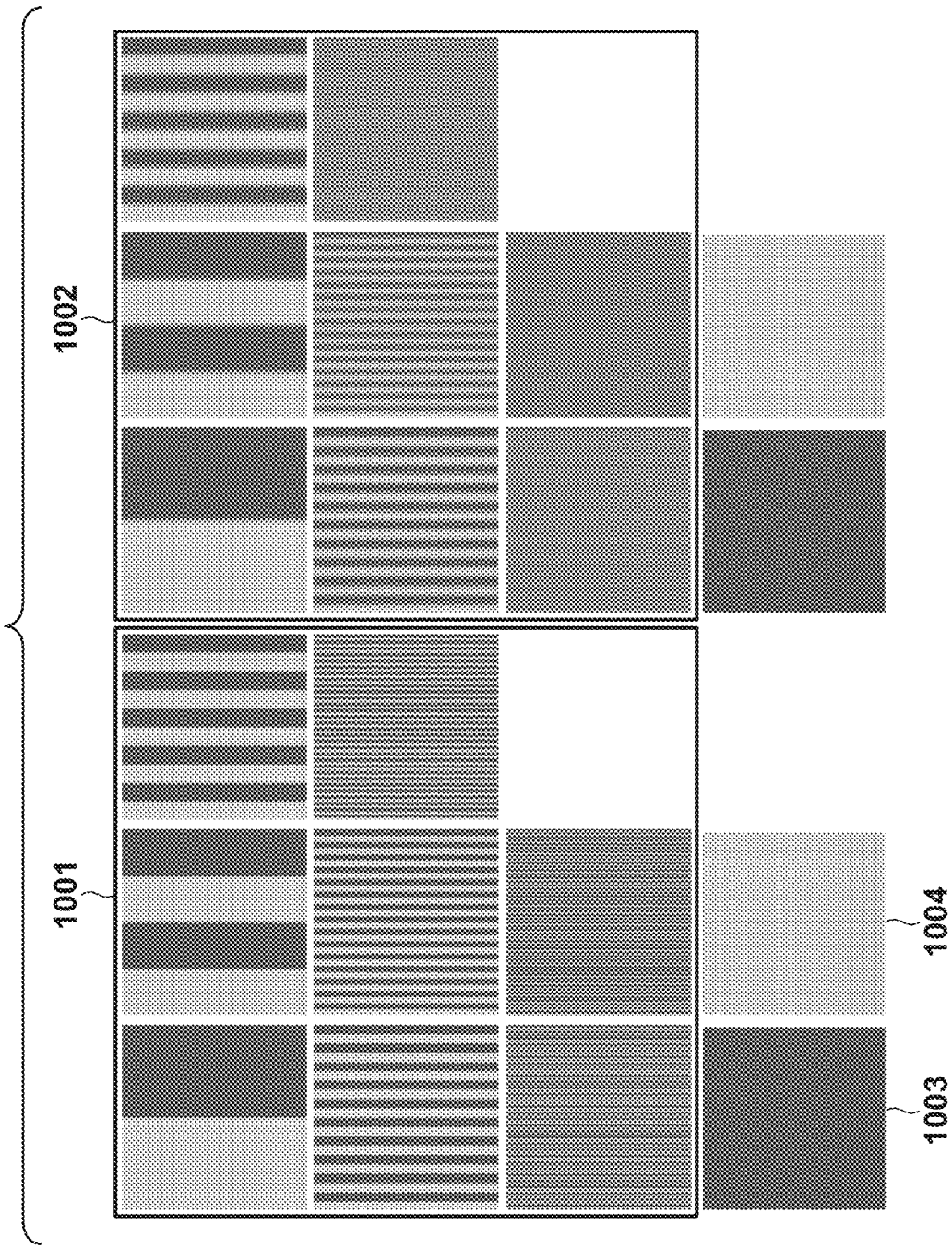

IMAGE PROCESSING APPARATUS, IMAGE PROCESSING METHOD, AND NON-TRANSITORY COMPUTER-READABLE STORAGE MEDIUM, WITH IMAGE PROCESSING BASED ON IMAGE PROCESSING CONDITION AND INFORMATION EQUIVALENT TO DISTANCE FROM FOCAL PLANE

BACKGROUND OF THE INVENTION

Field of the Invention

The present invention relates to an image processing apparatus, an image processing method, and a non-transitory computer readable storage medium, and particularly to an image processing apparatus, an image processing method, and a storage medium for effectively controlling, for example, the three-dimensional appearance of an image output to a printer.

Description of the Related Art

A human three-dimensionally perceives a thing looked with his/her eyes and is considered to perceive it by his/her brain based on clues from both eyes, clues from a single eye, motion parallax, and the like. The clues from both eyes include retinal parallax that is a difference between retinal images on both eyes. The clues from a single eye include line perspective, the dimensions of an object, the gradient of a texture, shading, perspective, and the effect of blurring. By using one or more of these clues, the human perceives a three-dimensional appearance, that is, the depth, thickness, and height of a "thing" and the anteroposterior relationship of the "thing".

When looking at a two-dimensional image captured by a camera or the like and displayed, projected, or printed, the human perceives the three-dimensional appearance of the image from a difference in blurring between an in-focus portion and a portion that is out of focus depending on the depth. That is, the reproduction of the focused (in-focus) portion and defocused (out-of-focus) portion of the image is important for the three-dimensional appearance.

Methods are being proposed to obtain distance information of a scene including an object generally at the time of shooting, such as a method of measuring an actual distance from a shooting point to a target by a laser distance meter or the like, and a method of measuring a distance from parallax information of two cameras. Japanese Patent Laid-Open No. 2009-251839 has proposed a technique as an image quality improvement method using depth information.

However, in the conventional technique, when an image is output from a printer or the like, the sharpness of the output image degrades owing to degradation of the sharpness of the image by a print medium or ink bleeding, or resolution conversion processing of resizing input image data into a print medium size (print size). The sharpness of a display image similarly degrades even on a display or a projector. Hence, the reproducibility of a focused (in-focus) portion and defocused (out-of-focus) portion of the image changes, and the three-dimensional appearance of the image felt by the human degrades or changes.

In Japanese Patent Laid-Open No. 2009-251839, processing is performed to estimate and calculate the depth of an image at each position, associate the depth with an image processing method, effectively select an image processing method for each position appropriately, and increase the resolution while preventing degradation of the three-dimensional appearance. However, depth information used in Japanese Patent Laid-Open No. 2009-251839 is information estimated and calculated from an image itself, so the depth may not be obtained correctly depending on the characteristic or composition of the image. As a result, processing suited to the target image cannot be performed, and the human may feel a sense of discomfort in the three-dimensional appearance of the image.

Also, in Japanese Patent Laid-Open No. 2009-251839, the three-dimensional appearance of an input image is controlled, but the characteristic of an output apparatus that influences the sharpness at the time of image reproduction is not considered. Processing suited to an image output from an output apparatus such as a printer or a display cannot be performed to the original three-dimensional appearance of an image, and the three-dimensional appearance may degrade or change.

As described above, the conventional technique does not solve the problem that the three-dimensional appearance of an image felt by a human degrades or changes in a reproduced output image.

SUMMARY OF THE INVENTION

Accordingly, the present invention is conceived as a response to the above-described disadvantages of the conventional art.

For example, an image processing apparatus, an image processing method, and a non-transitory computer readable storage medium according to this invention are capable of performing processing so that the three-dimensional appearance of an image felt by a human can be properly represented even in an output image.

According to one aspect of the present invention, there is provided an image processing apparatus comprising: a setting unit configured to set an image processing condition for performing image processing to image data of an input photographic image based on an output characteristic of an output apparatus that influences sharpness of an image output from the output apparatus; an obtaining unit configured to obtain information equivalent to a distance from a focal plane in the photographic image; and an image processing unit configured to perform image processing to the image data based on the information obtained by the obtaining unit and the image processing condition set by the setting unit.

According to another aspect of the present invention, there is provided a non-transitory computer readable storage medium storing a program for causing a computer to function as each unit of the image processing apparatus having the above arrangement.

According to still another aspect of the present invention, there is provided an image processing method comprising: setting an image processing condition for performing image processing to image data of an input photographic image based on an output characteristic of an output apparatus that influences sharpness of an image output from the output apparatus; obtaining information equivalent to a distance from a focal plane in the photographic image; and performing image processing to the image data based on the obtained information and the set image processing condition.

The invention is particularly advantageous since image processing is performed under an image processing condition considering the output characteristic of an output apparatus that influences the sharpness, in accordance with information equivalent to a distance from the focal plane at the time of image-capturing an object, and a three-dimensional appearance can be properly represented even in an output image.

Further features of the present invention will become apparent from the following description of exemplary embodiments (with reference to the attached drawings).

BRIEF DESCRIPTION OF THE DRAWINGS

FIG. 2 is a view showing the relationship between the focal plane, the image shift amount, and the defocus amount;

FIG. 3 is a view showing the relationship between the focal object distance, the image sensing plane distance to a focal image object, the object distance, and the distance from the focal plane to the object in an image capturing apparatus;

FIG. 5 is a block diagram showing the arrangement of an image processing unit;

FIG. 6 is a flowchart showing a general description of image processing;

FIG. 10 is a view showing an image for measurement for calculating the frequency characteristic (MTF characteristic) of an output image;

DESCRIPTION OF THE EMBODIMENTS

Exemplary embodiments of the present invention will now be described in detail in accordance with the accompanying drawings.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium (or sheet)" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Note that in the following description, although an inkjet printer will be described as an example of an output apparatus that outputs an image, a laser beam printer adopting an electrophotographic method may be used.

<General Description of Image Processing System (FIGS. 1 to 4B)>

Figure 1:
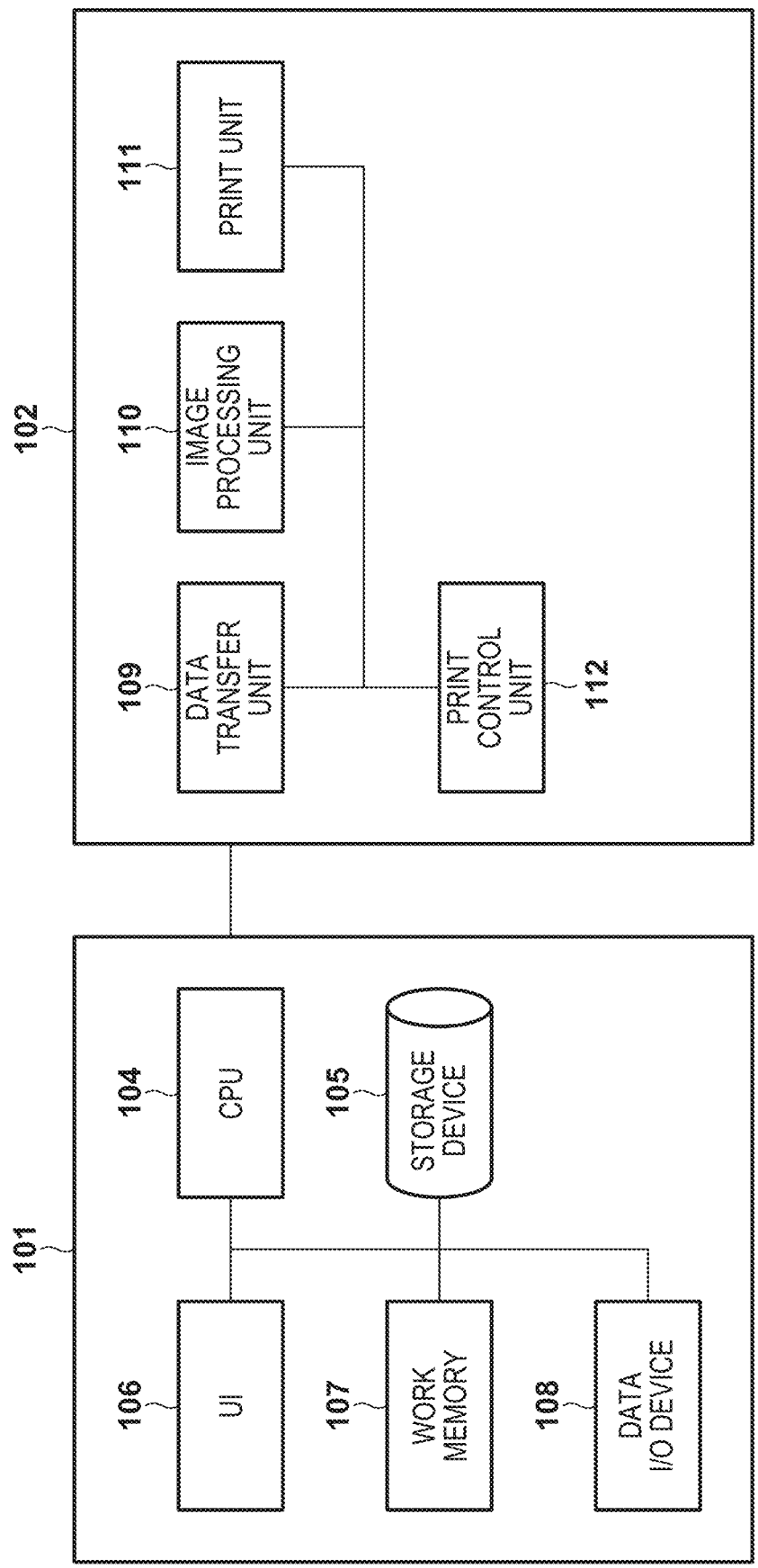
FIG. 1 is a block diagram showing the schematic arrangement of an image processing system according to an exemplary embodiment of the present invention.

FIG. 1 is a block diagram showing the overall arrangement of an image processing system (to be referred to as a system hereinafter) using an image processing apparatus according to an exemplary embodiment of the present invention. As shown in FIG. 1, the system is constituted by a personal computer apparatus (PC) 101 (to be referred to as a PC hereinafter) and an output apparatus 102. The PC 101 and the output apparatus 102 are connected by a wired/wireless network or an interface such as USB or local bus.

The PC 101 performs, for example, transfer of a print control instruction, necessary information, and image data to the output apparatus 102. A storage device 105 stores an OS, system programs, various applications, and parameter data necessary for various processes. The storage device 105 is constituted by a hard disk (HD), a solid state disk (SSD), and a rewritable storage medium such as a flash ROM. A CPU 104 performs processing using a work memory 107 such as a RAM when performing software stored in the storage device 105. In regard to performing the processing, an operation unit (to be referred to as a UI hereinafter) 106 serving as a user interface includes input devices such as a keyboard and a pointing device, and a display device such as a display in order to perform processing regarding input from the user and display to the user. A data I/O device 108 performs data input/output from/to an external storage medium such as an SD card. An image capturing apparatus (not shown) such as a digital camera may be directly connected to the data I/O device 108 or a data transfer unit 109 to transfer data without mediating an external storage medium.

The output apparatus 102 is constituted by the data transfer unit 109, a print control unit 112, an image processing unit 110 (to be described later), and a print unit 111. The PC 101 transmits print data to the output apparatus 102. The print data includes image data of photographic data obtained by image-capturing an object by the image capturing apparatus. The print data is formed by the image data, information equivalent to a distance from the focal plane at the time of shooting corresponding to the image data, image processing parameters serving as data unique to a print medium, print control data, and print information data such as a print quality and print medium selected on the UI. The information (to be described later) equivalent to a distance from the focal plane at the time of shooting includes a defocus amount, an image shift amount, and a distance from an actual focal plane to an object.

Although data generated by the image capturing apparatus such as a digital camera will be explained here, data is not limited to this and may be data generated from information obtained by actually measuring a distance. The data may be, for example, both data generated from the result of analyzing the blurring amount of input image data and another data at the time of shooting. The input image data and the information equivalent to a distance from the focal plane may be generated in the image capturing apparatus or generated in the PC 101 or output apparatus 102 connected to the image capturing apparatus.

Information for generating information equivalent to a distance from the focal plane may be obtained from the image capturing apparatus to generate information equivalent to a distance from the focal plane in the PC 101 or output apparatus 102 connected to the image capturing apparatus. It is also possible to connect the image capturing apparatus to the PC 101, and generate information in the output apparatus 102 that obtains via the PC 101 information for generating information equivalent to a distance from the focal plane. The information for generating information equivalent to a distance from the focal plane is, for example, a pair of images obtained by photoelectrically converting beams having passed through different regions of the exit pupil of an imaging lens.

The data transfer unit 109 extracts, from print data transmitted from the PC 101, input image data, data equivalent to a distance from the focal plane at the time of shooting, and image processing parameters, transfers them to the image processing unit 110, and transfers print control data to the print control unit 112. The input image data is data resized to the size of a user-set print medium by resolution conversion processing stored as a program in the storage device 105 within the PC 101. The resolution conversion processing may be performed similarly in the image processing unit 110 within the output apparatus 102. The image processing unit 110 is incorporated in the output apparatus 102 in this system, but may be incorporated in the PC 101.

The image processing parameters and the print control data are stored in a storage device (not shown) such as the storage device 105 in the PC 101 or the hard disk, ROM, or the like in the output apparatus 102. However, the image processing parameters and the print control data may be selected based on print information data in print data and transferred to the image processing unit 110 and the print control unit 112. The print control unit 112 controls the operation of the print unit 111 in accordance with the print control data. The print unit 111 is configured to print by discharging ink from a printhead complying with an inkjet method and forming an image on a print medium.

FIG. 2 is a view for explaining the relationship between the focal plane, the image shift amount, and the defocus amount at the time of shooting an object.

In FIG. 2, a focal plane 201 is an in-focus plane parallel to an image plane (image sensing plane) 203 in the image capturing apparatus. A defocus amount 205 is a difference between the image plane 203 and a defocused image sensing plane position 204 (a difference between a prospective imaging plane and an actual imaging plane), and is proportional to a blurring amount. As for the defocus amount 205, there are conventionally known a pupil division type phase difference detection method and an image capturing apparatus configured to detect a defocus amount using differently blurring images.

For example, Japanese Patent Laid-Open No. 2008-15754 has disclosed a method of calculating the defocus amount 205 from an image shift amount (a parallax amount) 206 of an image shown in FIG. 2. A correlation value is calculated while relatively shifting data with respect to a pair of pixel data obtained by photoelectric conversion of beams having passed through different regions of the exit pupil of an imaging lens. The image shift amount 206 having the highest correlation serves as a parallax amount.

Further, the defocus amount 205 from the prospective imaging plane of an object image plane is calculated with respect to the calculated image shift amount 206 using a conversion factor determined in accordance with the pixel pitch of an image sensor and a lens. Japanese Patent Laid-Open No. 2013-253964 has disclosed a method of calculating a defocus amount by the Depth From Defocus (DFD) method. In the DFD method, differently blurring images are obtained by controlling the photographing parameters of an image sensing optical system, a measurement target pixel and its neighboring pixel in a plurality of obtained images are used to calculate a correlation amount between their blurs, and a defocus amount is calculated.

Next, a method of calculating a distance between a focal plane and an object will be described.

FIG. 3 is a view showing the relationship between the focal plane, the object, the lens, and the image plane.

In FIG. 3, the formula of a lens is established between a distance OBJ(0) between the lens 202 and the focal plane 201, a distance S(0) between the lens 202 and the image plane 203, a distance OBJ(def) between an object 300 and the lens 202, and a distance L between the focal plane 201 and the object 300. In other words, equations (1) and (2) below are established, so the object distance OBJ(def) can be calculated by equation (3):

$$1/OBJ(0)+1/S(0)=1/f \qquad (1)$$

$$1/OBJ(def)+1/\{S(0)+def\}=1/f \qquad (2)$$

$$OBJ(def)=\{(S(0)+def)*f\}/\{(S(0)-def)*f\} \qquad (3)$$

where OBJ(0) is the focal object distance, S(0) is the image sensing plane distance, and OBJ(def) is the object distance. The distance L from the focal plane 201 to the object 300 can be calculated by subtracting the object distance OBJ(def) calculated by equation (3) from the object distance OBJ(0).

The above-mentioned information equivalent to a distance from the focal plane is information proportional to a distance from the focal plane. The information equivalent to a distance from the focal plane can be any of the image shift amount 206, the defocus amount 205, and the distance L from the focal plane to the object.

Next, a defocus map will be explained.

Figure 4A:
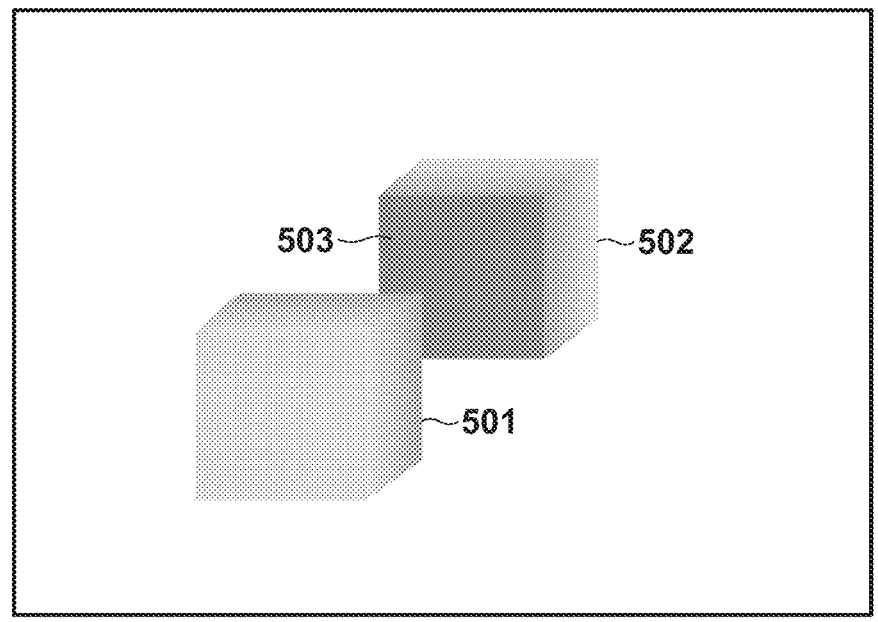
FIGS. 4A and 4B are views exemplifying a defocus map and each area.
Figure 4B:
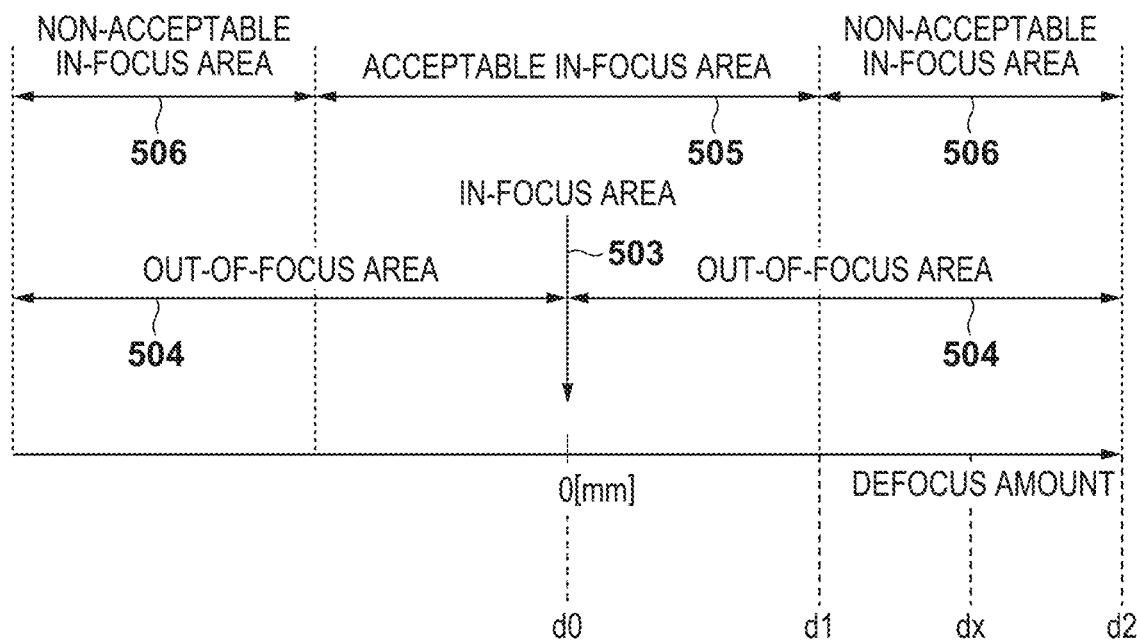

FIGS. 4A and 4B are views for explaining the defocus map.

The defocus map is a map of defocus amounts descried above at a plurality of portions on an input image. Here, the defocus map holds information of defocus amounts corresponding to respective pixels of image data obtained by shooting two cubes 501 and 502 as shown in FIG. 4A. FIG. 4B is a view for explaining the defocus amount and each area used in image processing here.

In FIG. 4B, a defocus amount 0 is a defocus amount equivalent to a focal plane at the time of shooting and corresponds to a blackest portion (an area 503) in FIG. 4A. As the defocus amount moves apart from the defocus amount 0, the image becomes whitish in FIG. 4A. In the defocus map shown in FIG. 4A, an area of the defocus amount 0 is the area 503 and is an in-focus (focal plane) image area. This area will be called an "in-focus area" as represented by 503 in FIG. 4B.

An area other than the in-focus area 503 will be called an out-of-focus area 504 that is an area not corresponding to the focal plane on the defocus map. An area accepted to be in focus will be called an acceptable in-focus area 505. An area other than the acceptable in-focus area 505 will be called a non-acceptable in-focus area 506 as an area that is not the acceptable in-focus area 505. The range of the acceptable in-focus area 505 is defined by, for example, the depth of field and information equivalent to a distance from the focal plane. The depth of field serving as an in-focus range is determined by information of a lens, stop, and the like at the time of shooting. The depth of field in information equivalent to a distance from the focal plane is defined as the acceptable in-focus area. The acceptable in-focus area in an input image seems to be in focus. In contrast, the non-acceptable in-focus area in the input image is out of focus. Thus, the user feels the three-dimensional appearance of the image even from the sharpness difference between the acceptable in-focus area and the non-acceptable in-focus area.

The acceptable in-focus area may be defined at user's own judgment by experiment. Since the sharpness and the three-dimensional appearance change depending on the user or the environment, the range of an area accepted to be in focus also varies depending on the user or the environment. Subject experiment is performed under predetermined conditions, and the relationship between information equivalent to a distance from the focal plane and the acceptable in-focus area can be defined. Although the definition method will be described later, it is desirable to perform subject experiment under conditions in which the sharpness of an input image does not change or degrade regardless of output or display or in a situation in which the output characteristic of an output apparatus that influences the sharpness is obtained.

The abscissa represents the defocus amount in FIG. 4B, but may be the above-described image shift amount or information of a distance from the focal plane, which is information equivalent to a distance from the focal plane. In FIG. 4B, d0 represents a defocus amount of 0, that is, an in-focus area, and dx represents a defocus amount in the non-acceptable in-focus area.

Next, image processing for printing an image with a three-dimensional appearance on a print medium in the image processing system having the above-described arrangement will be described.

<General Description of Image Processing (FIGS. 5 and 6)>

FIG. 5 is a block diagram showing the arrangement of the image processing unit 110.

As shown in FIG. 5, the image processing unit 110 is constituted by a three-dimensional appearance control unit 401 and an output image generation unit 402. The three-dimensional appearance control unit 401 performs image processing of receiving image data and a defocus map transmitted from the PC 101 and an image processing condition stored in the PC 101 or the output apparatus 102, and giving a three-dimensional appearance to an image. Based on image data (RGB) output from the three-dimensional appearance control unit 401, the output image generation unit 402 generates data used to print an image by discharging ink from the printhead of an inkjet printer.

FIG. 6 is a flowchart showing image processing for giving a three-dimensional appearance.

First, in steps S601 and S602, the image processing unit 110 receives image data, and the above-described defocus map as information equivalent to a distance from the focal plane at the time of shooting an object. Then, in step S603, the three-dimensional appearance control unit 401 receives an image processing condition that is set based on the output characteristic of the output apparatus 102 stored in the storage device 105 or a storage device (not shown) such as the hard disk or ROM in the output apparatus 102. In this case, an image processing condition is held in the storage device for each print condition. An image processing condition is selected in accordance with the above-described print information data and input to the three-dimensional appearance control unit 401.

In step S604, the three-dimensional appearance of the image is controlled in accordance with the input image data, the defocus map, and the image processing condition set based on the output characteristic of the output apparatus 102. Note that details of processing in the three-dimensional appearance control unit 401 and details of the image processing condition will be described later.

In step S605, the output image generation unit 402 generates data used to print an image by discharging ink from the inkjet printhead based on image data (RGB) output from the three-dimensional appearance control unit 401. The generation processing includes color conversion processing of converting device-independent RGB data into device-dependent RGB data, ink color decomposition processing of converting the device-dependent RGB data into ink color data, and tone correction processing of performing tone correction to linearly associate the ink color data with the gradation characteristic of a printing apparatus. Further, the ink color data undergoes half-toning processing for ON/OFF information of ink dots, mask data conversion processing of generating binary data to be printed by each print scanning of the printhead, and the like. These processes are well known ones in the inkjet printer and are not a part concerning the gist of the embodiment, so a detailed description thereof will be omitted.

Finally, in step S606, the output data generated by the output image generation unit 402 is transferred to the print unit 111, and an image is printed on a print medium based on the output data.

<Three-Dimensional Appearance in Output Apparatus>

The output characteristic of the output apparatus 102 that influences the sharpness, and control of the three-dimensional appearance will now be described.

When looking at a two-dimensional image shot by a camera or the like, a human feels the sense of depth and three-dimensional appearance of an image from the difference between the sharpness of an acceptable in-focus area including a focused (in-focus) area and that of a defocused (out-of-focus) non-acceptable in-focus area.

When an image is output through an output apparatus such as a printer described here, the sharpness of the image degrades owing to, for example, degradation of the sharpness of the image by a print medium or ink bleeding, or resolution conversion processing of resizing input image data into a print medium size (print size). The sharpness of an output image similarly degrades even on a display or a projector.

Figure 13A:
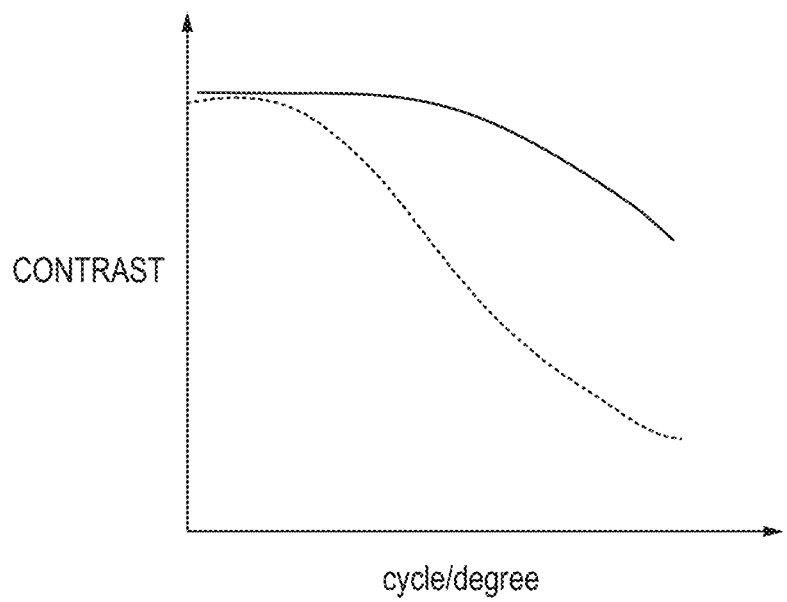
FIGS. 13A and 13B are graphs showing the relationship between the contrast and the spatial frequency (cycle/degree).
Figure 13B:
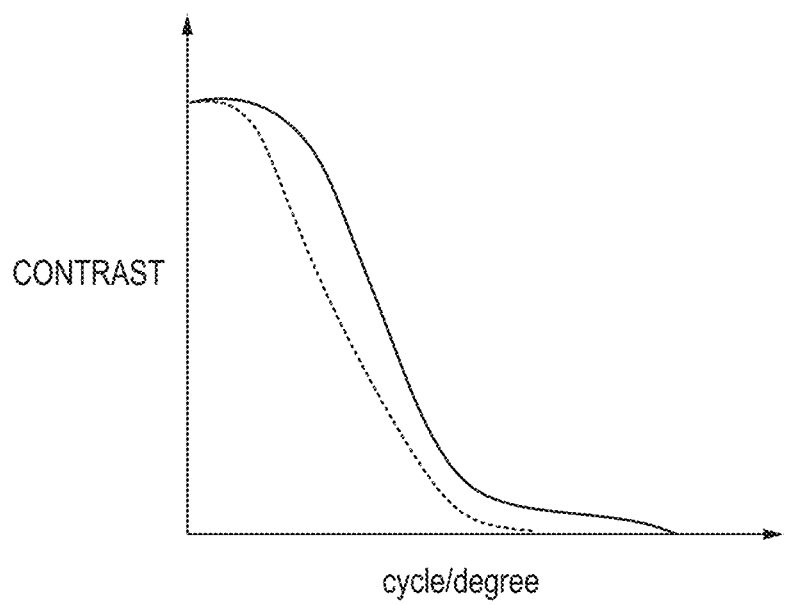

FIGS. 13A and 13B are graphs showing the relationship between the contrast and the spatial frequency (cycle/degree).

In FIG. 13A, a solid line represents the input characteristic of the in-focus area at a defocus amount of 0 (d0 in FIGS. 7A to 7C to be described later), and a broken line represents the output characteristic. Similarly, in FIG. 13B, a solid line represents the input characteristic of the out-of-focus area at a specific defocus amount (dx in FIGS. 7A to 7C to be described later), and a broken line represents the output characteristic. Although FIGS. 7A to 7C to be described later show an example when enlargement processing is performed as resolution conversion processing, same size processing is performed as resolution conversion processing in FIGS. 13A and 13B for descriptive convenience.

As shown in FIGS. 13A and 13B, the sharpness of an input image depending on the output characteristic of the output apparatus greatly changes in the (in-focus) acceptable in-focus area where the sharpness of input data is high, and hardly changes in the (out-of-focus) non-acceptable in-focus area where the sharpness of input data is low. The degree of change of the sharpness is different between areas. More specifically, the degradation characteristic of the sharpness differs between defocus amounts. For this reason, an output image does not maintain the sharpness relationship between the acceptable in-focus area and the non-acceptable in-focus area that influences the three-dimensional appearance of an input image.

Figure 7A:
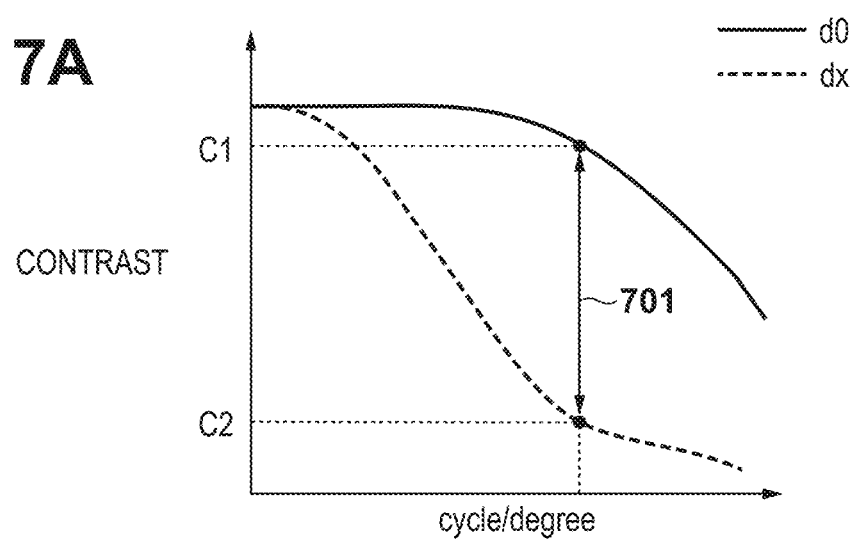
FIGS. 7A, 7B, and 7C are graphs showing the relationship in contrast at a specific frequency between the in-focus area and out-of-focus area of an image at a specific defocus amount.
Figure 7B:
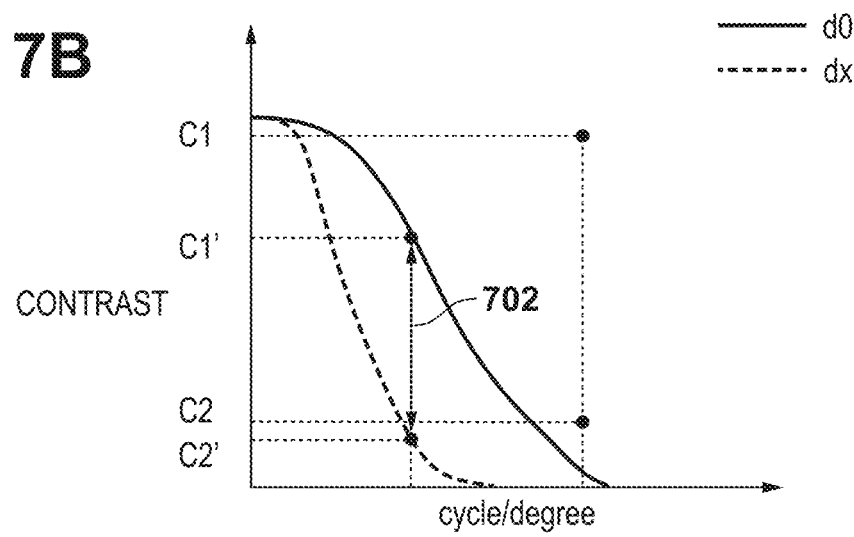
Figure 7C:
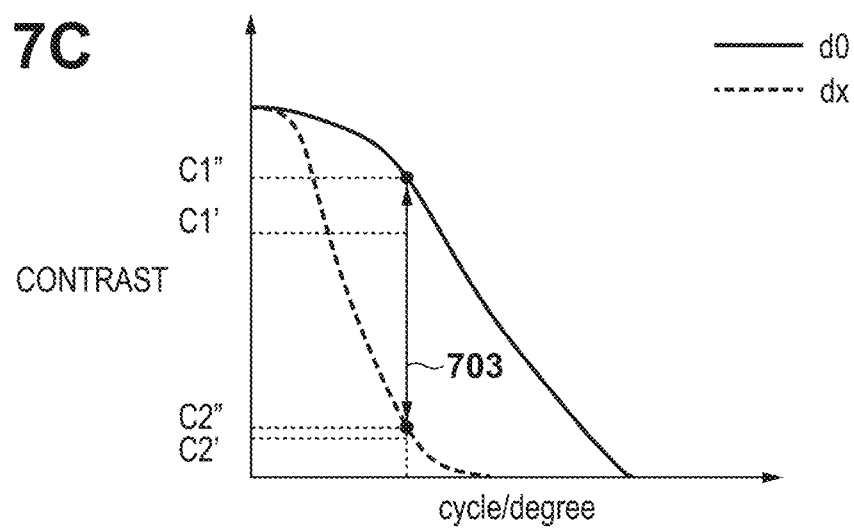

FIGS. 7A to 7C are graphs showing the relationship between the contrast and the spatial frequency (cycle/degree). In FIGS. 7A to 7C, a solid line d0 represents a contrast at a defocus amount of 0, that is, in the in-focus area, and a dotted line dx represents a contrast at the defocus amount dx, that is, in the non-acceptable in-focus area.

In FIGS. 7A to 7C, for descriptive convenience, an image is treated as an image in which the spatial frequency characteristic of the image in the in-focus area and the spatial frequency characteristic of the image corresponding to a specific defocus amount included in the out-of-focus area have a peak at the same frequency. In this case, an input image undergoes enlargement processing to resize it into a print medium size and then is output to the printer. The output characteristic shown in FIGS. 7A to 7C is an output characteristic that reflects degradation factors of sharpness arising from the output apparatus. The degradation factors of the sharpness are resolution conversion processing, a print medium, ink bleeding, and the like, as described above. Although enlargement processing is exemplified as resolution conversion processing, the resolution conversion processing may be same size processing or reduction processing.

In an input image that has a three-dimensional appearance due to blurs, a contrast value C1 representing a sharpness of input image data in the in-focus area at a specific spatial frequency and a contrast value C2 representing a sharpness in the out-of-focus area have a relationship shown in FIG. 7A. When this input image is enlarged, the contrast values C1 and C2 change to C1' and C2', as shown in FIG. 7B.

As is apparent from FIGS. 7A and 7B, the change amount of the sharpness of the input image is different between the in-focus area and the out-of-focus area in accordance with the output characteristic of the output apparatus 102. A sharpness difference 702 (a difference between the contrast values C1' and C2') that influences the three-dimensional appearance becomes smaller than a sharpness difference 701 (a difference between the contrast values C1 and C2) in the input image. As a result, the output image cannot obtain a proper three-dimensional appearance. To solve this, the sharpness is properly controlled based on an image blurring state equivalent to the above-described defocus amount and the output characteristic of the output apparatus 102 that influences the sharpness, thereby obtaining an output image with a three-dimensional appearance.

The contrast values of the in-focus area and out-of-focus area have a relationship in FIG. 7C in an output image in which the sharpness of the image is properly controlled using the relationship between the defocus amount and the three-dimensional appearance control amount based on the output characteristic of the output apparatus 102 set in an image output condition to be described later. In FIG. 7C, C1" denotes the contrast value of the in-focus area and C2" denotes the contrast value of the out-of-focus area.

As shown in FIG. 7C, in an output image having undergone three-dimensional appearance control processing based on the image output condition, a sharpness difference 703 (a difference between the contrast values C1" and C2") becomes larger than the sharpness difference 702 (the difference between the contrast values C1' and C2') obtained when no processing is performed.

Since the sharpness difference 703 comes close to the sharpness difference 701 (the difference 701 between the contrast values C1 and C2) in the input image, a proper three-dimensional appearance can be obtained.

In FIGS. 7A to 7C, contrasts at two points of an image that correspond to the spatial frequency of the image in the in-focus area and a specific defocus amount included in the out-of-focus area are compared for descriptive convenience. The above-described relationship is established even for the in-focus area and an image corresponding to another defocus amount in the out-of-focus area. Also, the above-described relationship is established even at two points corresponding to an image corresponding to a specific defocus amount included in the acceptable in-focus area and corresponding to a specific defocus amount included in the non-acceptable in-focus area.

The contrast value has been picked up as an image characteristic that influences the sharpness of an image. As for a change of the sharpness of an image in the in-focus area and the out-of-focus area depending on the output characteristic of the output apparatus 102, it is obvious that the same relationship can be explained even in a spatial frequency characteristic representing the sharpness.

<Three-Dimensional Appearance Control Processing (FIGS. 8A to 9B)>

Three-dimensional appearance control processing performed by the three-dimensional appearance control unit 401 will be described below.

The three-dimensional appearance control unit 401 controls the sharpness of input image data using a sharpness control parameter set in the image processing condition. A three-dimensional appearance control amount corresponding to each defocus amount is set in the image processing condition.

FIGS. 8A to 8D are graphs showing the relationship between the defocus amount and the three-dimensional appearance control amount that is set in the image processing condition. Note that an image processing condition creation method will be described below.

The three-dimensional appearance control unit 401 performs sharpness processing by applying a three-dimensional appearance control amount set in the image processing condition while referring to a defocus amount in the defocus map for a processing target pixel with respect to brightness information of each pixel of input image data. The sharpness processing uses, for example, a Laplacian Of Gaussian filter (equation (4)) or an unsharp mask. Equation (5) is a transformation for brightness information of input image data in use of the Laplacian Of Gaussian filter represented by equation (4):

$$h(x,y)=(x^2+y^2-2\sigma^2)/(2\pi\sigma^2)\cdot\exp[-(x^2+y^2)/(2\sigma^2)] \quad (4)$$

$$\mathrm{Out}(x,y)=I(x,y)-\beta\times h(x,y)\times I(x,y) \quad (5)$$

wherein Out(x,y) is image data after three-dimensional appearance control processing, and β is a three-dimensional appearance control amount with respect to a defocus amount set in the image processing condition.

In FIGS. 8A to 8D, β=β1 at the defocus amount d=0 represents a control amount for the in-focus area of an input image. A defocus amount d1 is a value at the boundary between the acceptable in-focus area and the non-acceptable in-focus area shown in FIG. 4B. A defocus amount d2 is a maximum defocus amount included in the defocus map.

Figure 8A:
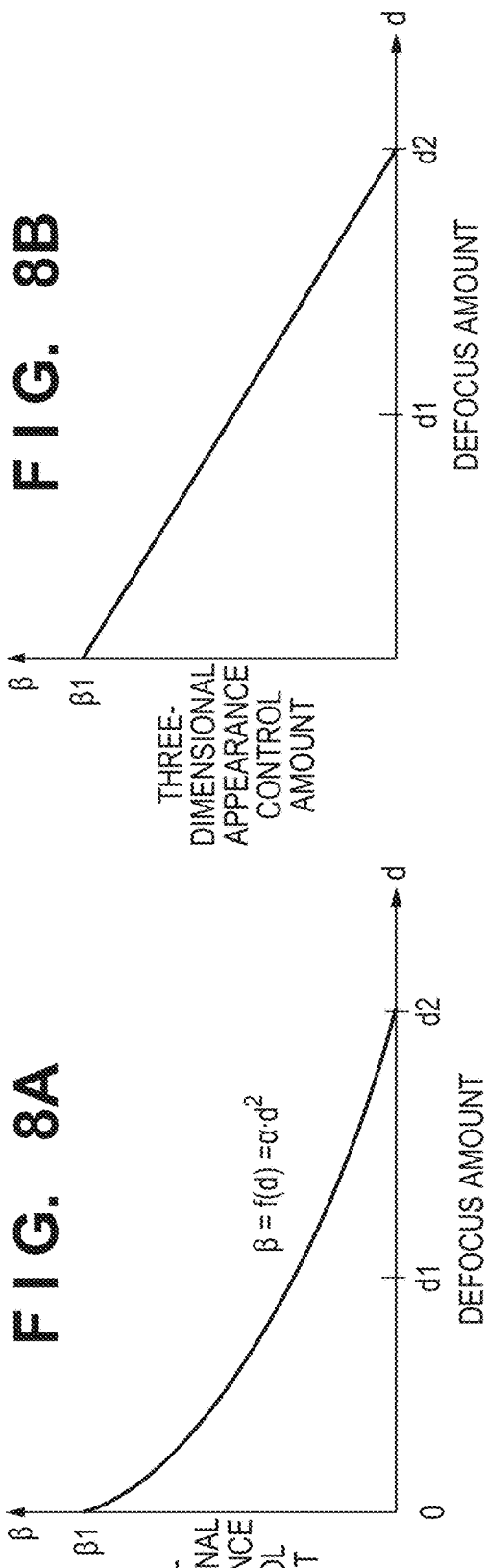
FIGS. 8A, 8B, 8C, and 8D are graphs showing the relationship between the defocus amount and the three-dimensional appearance control amount.
Figure 8B:
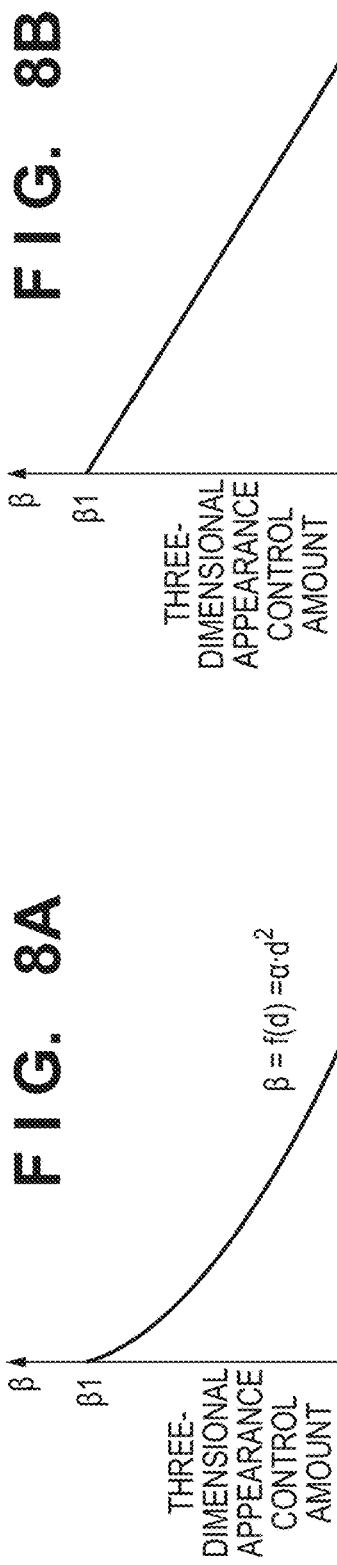
Figure 8C:
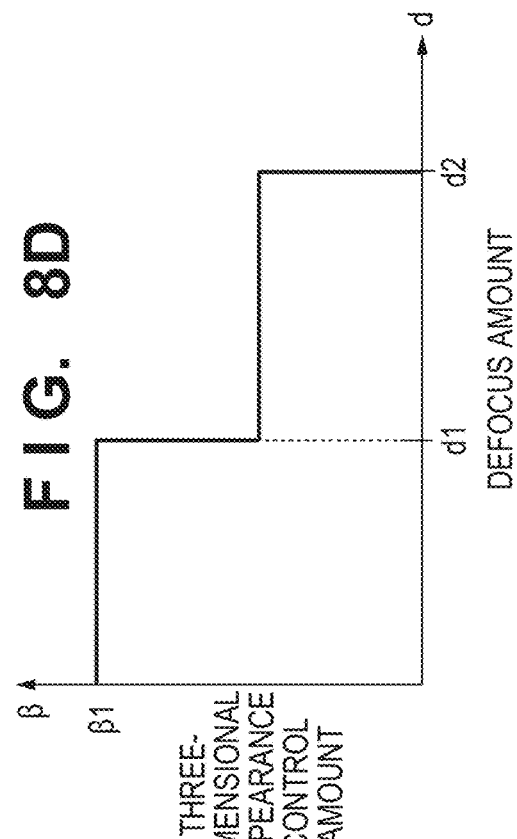

Note that FIGS. 8A to 8D show the three-dimensional appearance control amount. In the in-focus area where the defocus amount d=0, the three-dimensional appearance control amount takes a large value because the sharpness is greatly changed by output from the output apparatus, as shown in FIGS. 13A and 13B. In the out-of-focus area where the defocus amount takes a value larger than d1, the three-dimensional appearance control amount also takes a value smaller than that in the in-focus area because a change of the sharpness is smaller than that in the in-focus area. To obtain a proper three-dimensional appearance considering the output characteristic of the output apparatus 102 in an output image, an image processing condition is set to maximize the three-dimensional appearance control amount for the pixels of the in-focus area in an input image, as shown in FIGS. 8A to 8C. It is desirable to set a three-dimensional appearance control amount in the out-of-focus area so that the control amount becomes smaller as the defocus amount becomes larger, that is, the control amount monotonously decreases.

When a defocus amount equivalent to a distance from the focal plane is a value corresponding to the blurring amount of an image, the defocus amount and the three-dimensional appearance control amount have a nonlinear relationship, as shown in FIG. 8A. When the defocus amount corresponds to an image shift amount, the defocus amount and the three-dimensional appearance control amount have a linear relationship, as shown in FIG. 8B.

Even if the three-dimensional appearance control amount is set to be 0 for the non-acceptable in-focus area, as shown in FIG. 8C, the sharpness difference between the acceptable in-focus area and the non-acceptable in-focus area comes close to the sharpness difference between the acceptable in-focus area and the non-acceptable in-focus area in the input image, and the three-dimensional appearance of the output image can be obtained.

The control amount differs depending on the characteristic of a print medium, that of ink, and the print medium size. This is because the degree of degradation of the sharpness of an image by ink bleeding or the like changes for each print medium or each ink characteristic, and the resizing ratio of resolution conversion processing changes depending on the print medium size.

Figure 9A:
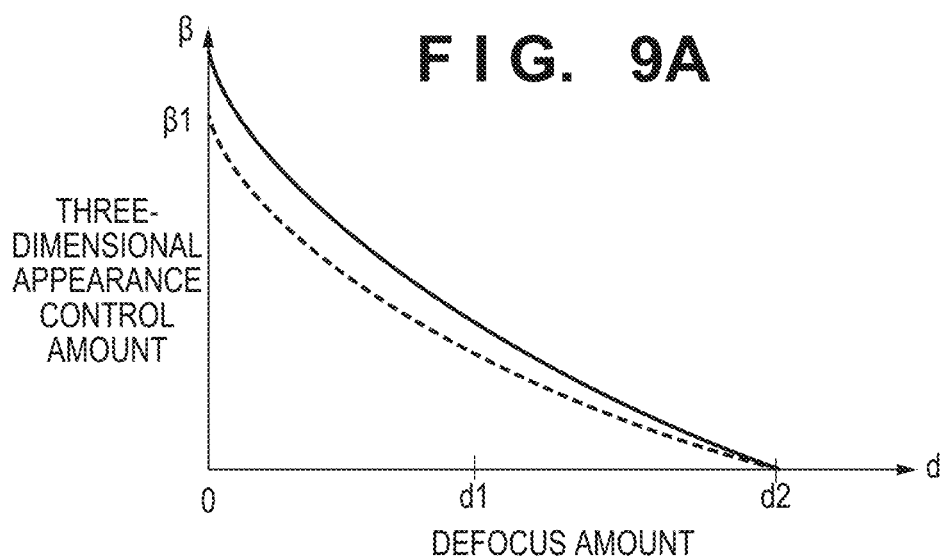
FIGS. 9A and 9B are graphs showing the relationship between the defocus amount and the three-dimensional appearance control amount when a print medium or a print medium size is different.
Figure 9B:
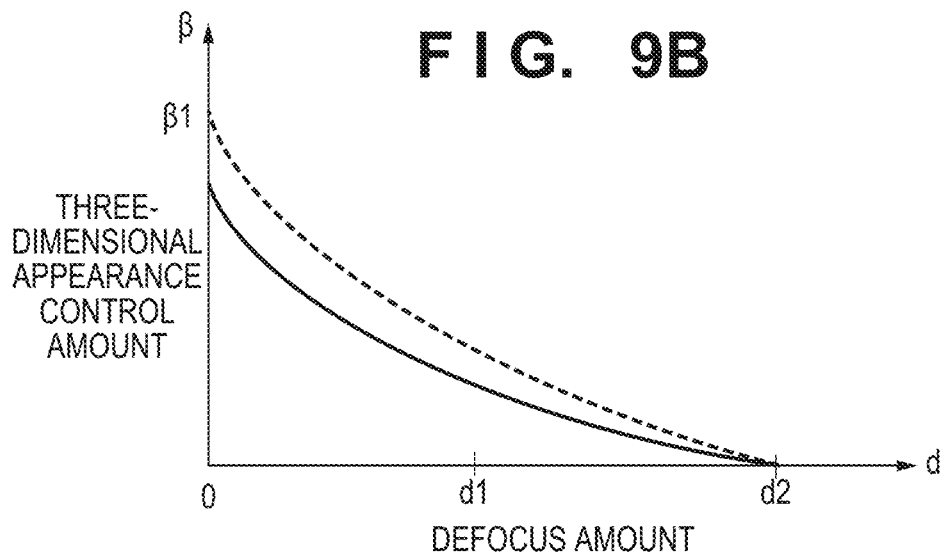

FIGS. 9A and 9B are graphs showing the difference of the three-dimensional appearance control amount depending on the characteristic of a print medium, that of ink, and the print medium size. In FIGS. 9A and 9B, a broken line represents the same output characteristic as that shown in FIG. 8A.

In FIG. 9A, a solid line represents a three-dimensional appearance control amount with respect to a defocus amount when an image is output under a condition different from that in FIG. 8A. The output characteristic shown in FIG. 9A represents a case in which the three-dimensional appearance control amount is large because, for example, ink bleeding is larger than that in FIG. 8A or the resizing ratio is higher. To the contrary, the output characteristic shown in FIG. 9B represents a case in which the three-dimensional appearance control amount is small because ink bleeding is smaller than that in FIG. 8A or the resizing ratio is lower.

Note that the filter used in sharpness processing is not limited to the Laplacian Of Gaussian filter. For example, a filter (specific filter) created by obtaining the inverse characteristic of degradation information of the sharpness of the output apparatus may be used to perform sharpness processing, and adjust and control the sharpness.

Figure 8D:
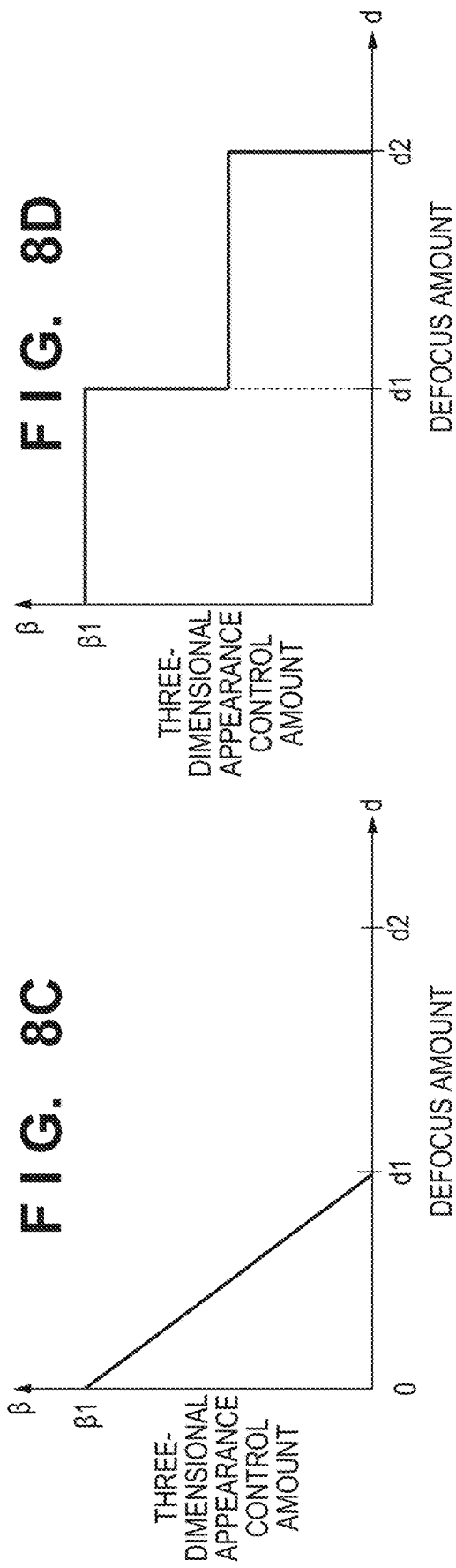

Sharpness processing has been exemplified as processing of controlling the sharpness in the above description, but this processing may be contrast processing. More specifically, brightness conversion is performed to increase the contrast of the brightness value of each pixel of input image data in the acceptable in-focus area including the in-focus area, as shown in FIG. 8D. As for the brightness conversion, there are a method using a transformation in which the three-dimensional appearance control amount is a coefficient, and a method of increasing the contrast by equalizing a histogram generated from the brightness value of each pixel of input image data. However, the brightness conversion is not limited to them as long as the contrast can be controlled.

Since sharpness processing and contrast processing can control the sharpness of an output image, either processing may be selected in accordance with the characteristic of the output apparatus or both of them may be used in combination.

<Image Processing Condition (FIGS. 10 to 12)>

An image processing condition creation method in three-dimensional appearance control processing will be described here.

FIG. 10 is a view showing an example of an image for measurement.

For example, an image for measurement as shown in FIG. 10 is output from an output apparatus such as a printer, a display, or a projector. Then, a parameter to be set as an image processing condition is calculated from the frequency characteristic (MTF characteristic) of the output image from the output apparatus that is obtained using a measurement apparatus (not shown). Instead of actually measuring the output image using the measurement apparatus, the MTF characteristic of the output apparatus may be calculated from an image obtained by simulating, on the PC, each image processing when generating the output image.

A sample image shown in FIG. 10 includes a group 1001 of images corresponding to the in-focus focal plane and a group 1002 of images expressed by a blur equivalent to the blurring amount of an input image at a given defocus amount. More specifically, the sample image is a chart including a plurality of rectangular patterns or sinusoidal patterns of different frequencies, and uniform patterns 1003 and 1004.

In the example shown in FIG. 10, the image groups 1001 and 1002 are formed from a plurality of sinusoidal patterns of different frequencies. The uniform patterns 1003 and 1004 are formed from maximum and minimum pixel values on the sinusoidal pattern, respectively.

Figure 11:
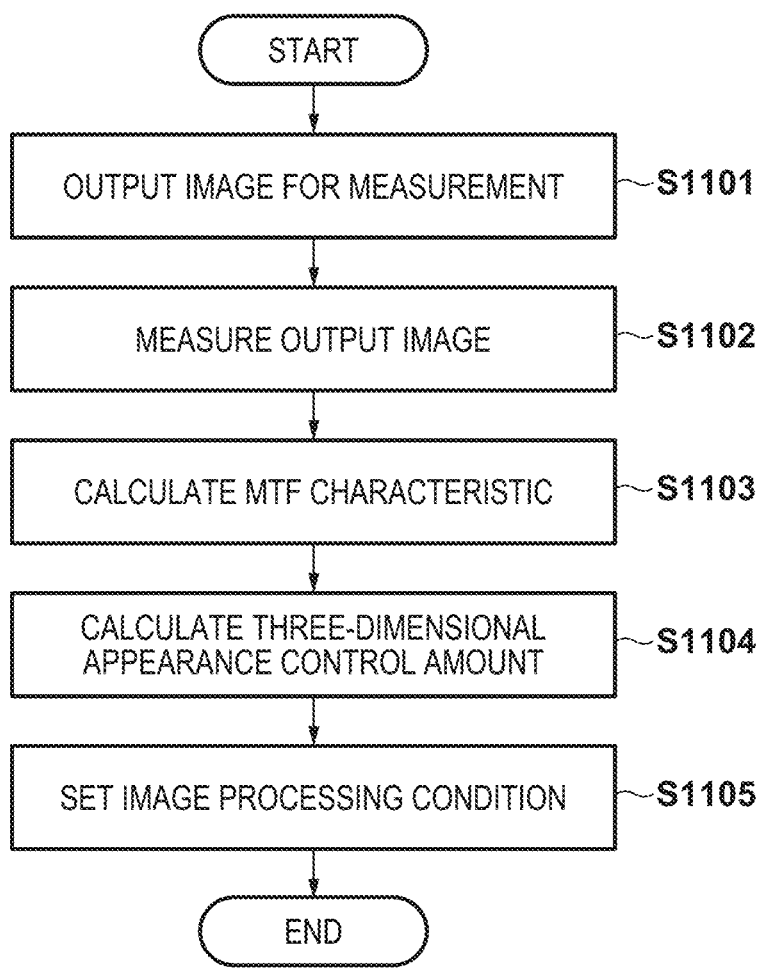
FIG. 11 is a flowchart showing image processing condition creation processing.

FIG. 11 is a flowchart showing an image processing condition creation method.

First, in step S1101, the image for measurement shown in FIG. 10 is output from the output apparatus 102. Then, in step S1102, the image for measurement output from the output apparatus 102 is measured using the measurement apparatus to obtain information necessary to calculate the MTF characteristic.

In a case where the image for measurement is formed from sinusoidal patterns of different frequencies as shown in FIG. 10, the MTF characteristic is calculated using equation (6) or equation (7) in step S1103. This value means the absolute value of an optical transfer function. If the average luminosity of the output image changes, equation (7) is used preferably. Equation (6) and equation (7) are:

$$MTF(u) = \{C(u)\}/C'$$

u: frequency of a sine wave $$C(u)=\{\text{Max}(u)-\text{Min}(u)\}/\{\text{Max}(u)+\text{Min}(u)\}$$

$$C'=\{(R1-R2)\}/\{(R1+R2)\}$$

Max(u): maximum reflectance of a sinusoidal pattern that changes depending on the frequency Min(u): minimum reflectance of a sinusoidal pattern that changes depending on the frequency R1, R2: reflectances of a uniform pattern (R1>R2)

$$MTF(u)=\{\text{Max}(u)-\text{Min}(u)\}/\{R1-R2\} \tag{7}$$

Note that the R1 and R2 values in equation (6) and equation (7) are reflectances, but the brightness, density, or device RGB value may be used, as a matter of course. The measurement apparatus can be, for example, a scanner, a digital camera, or a microscope if the output apparatus is a printer, and can be a digital camera if the output apparatus is a display or a projector.

In a case where the image for measurement is a rectangular wave pattern, the MTF characteristic of the output apparatus is expressed by a contrast transfer function (CTF) obtained by applying equation (6) or equation (7). Alternatively, an MTF value converted from a CTF value using the Coltman correction equation may be used.

By the above-described method, the frequency characteristics (MTF characteristics) of each image in the image group 1001 corresponding to the focal plane included in the image for measurement and the image group 1002 corresponding to any desired defocus amount are obtained.

Figure 12:
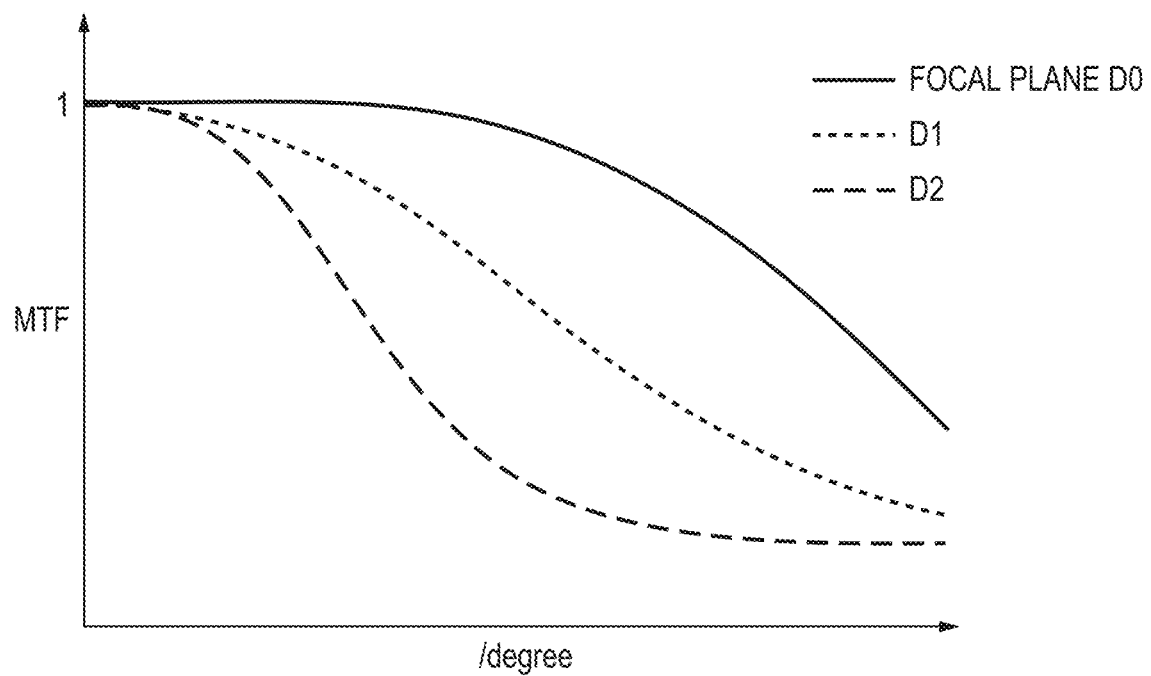
FIG. 12 is a graph exemplifying the frequency characteristics (MTF characteristics) of pixel groups corresponding to the focal plane and an arbitrary defocus amount.

FIG. 12 is a graph showing an example of the frequency characteristic.

In FIG. 12, a solid line D0 represents the characteristic of the image group 1001 corresponding to the focal plane, a dotted line D1 represents the characteristic of an image group corresponding to a defocus amount included in the acceptable in-focus area, and a broken line D2 represents the characteristic of an image group corresponding to a defocus amount included in the non-acceptable in-focus area.

An MTF characteristic can therefore be obtained for each defocus amount. That is, the output characteristic of the output apparatus regarding the sharpness for each defocus amount is obtained.

To obtain a proper three-dimensional appearance in an output image, the sharpness difference between the acceptable in-focus area and the non-acceptable in-focus area in the output image needs to come close to the sharpness difference between the acceptable in-focus area and the non-acceptable in-focus area in an input image in the case of applying three-dimensional appearance control processing, compared to the case of not applying this processing. In other words, to properly control the sharpness difference between the acceptable in-focus area and the non-acceptable in-focus area in an output image, the three-dimensional appearance control amount needs to be set in accordance with the output characteristic of the output apparatus that influences the sharpness for each defocus amount.

More specifically, in step S1104, the three-dimensional appearance control amount is set so that the sharpness or frequency characteristic of the in-focus area of the output image at a specific frequency is restored by sharpening processing to the sharpness or frequency characteristic of the input image. Similarly, as for the out-of-focus area, the restoration amount is calculated from an MTF characteristic obtained for each defocus amount and is used as a three-dimensional appearance control amount. In this manner, the three-dimensional appearance control amount is calculated for the defocus amount shown in FIGS. 8A to 8D.

For example, the relationship between the defocus amount and the sharpness is set as a relation that receives a defocus amount and outputs a three-dimensional appearance control amount, as shown in FIGS. 8A to 8D, or is set by selecting a parameter according to the LUT method.

Needless to say, the method of setting the relationship is not limited to them and any method is acceptable as long as the three-dimensional appearance control amount can be calculated for the defocus amount. The three-dimensional appearance control amount is not limited to a value for restoring the MTF characteristic. A proper three-dimensional appearance is obtained in an output image if it is satisfied that the sharpness difference when performing sharpening processing in accordance with a defocus amount and sharpening control amount based on the output characteristic of the output apparatus 102 set in the image processing condition becomes larger than the sharpness difference when not performing the processing. When the control amount 131 of the focal plane shown in FIGS. 8A to 8D is set to restore the MTF characteristic of an image from 0.8 to 1.2, an image with desirable sharpness on the focal plane in an output image is obtained.

Finally, in step S1105, an image processing condition derived from the output characteristic of the output apparatus 102 regarding the sharpness in accordance with the defocus amount is set, as described above.

According to the above-described embodiment, the three-dimensional appearance of an output image can be controlled by performing image processing using the defocus map based on an image processing condition set for input image data.

A method of defining an acceptable in-focus area using the measurement image shown in FIG. 10 will be explained. The measurement image (FIG. 10) includes an image corresponding to the focal plane and a group of images expressed by a blur equivalent to the blurring amount of an input image at a given defocus amount. The image group is displayed or output by the output apparatus, and a subject is prompted to select another image group for which he/she feels that the sharpness difference is small (the image is in focus), compared to the image corresponding to the focal plane. Accordingly, a defocus amount that defines the acceptable in-focus area can be determined.

In a case where subject experiment is performed using a display apparatus or an output product, degradation or change of the sharpness by the output apparatus needs to be considered. The acceptable in-focus area cannot be desirably defined unless change or degradation of the sharpness is canceled or reduced in an image looked by the subject. It is therefore preferable to use an output apparatus in which degradation or change of the sharpness is little. Alternatively, an inverse filter or the like is created from the above-described MTF characteristic to display an image in which change or degradation of the sharpness is canceled or reduced.

Another method of defining an acceptable in-focus area is as follows. First, the sharpness of each image group is calculated by applying a human visual characteristic (VTF) or a contrast sensitivity function to the frequency characteristic of each image group. Then, the acceptable in-focus area is defined from the sharpness difference between an image corresponding to the focal plane and a group of images expressed by a blur equivalent to the blurring amount of an input image at a given defocus amount. In this case, the acceptable in-focus area is defined at a defocus amount used to create an image group in which the above-mentioned sharpness difference becomes equal to or smaller than any desired threshold. The threshold is defined so that, for example, if a response characteristic to the image corresponding to the focal plane is 1, the difference becomes 0.8 or more.

In the above-described embodiment, the relationship between the defocus amount and the three-dimensional appearance control amount is exemplified as the image processing condition. However, the relationship between the three-dimensional appearance control amount, and the image shift amount or the distance between the focal plane and the object, which is information equivalent to a distance from the focal plane, may be adopted as the image processing condition.

In the above-described embodiment, data obtained by shooting by an image capturing apparatus such as a camera is used as image data of a photographic image, and a defocus amount at the time of shooting is used as information equivalent to a distance from the focal plane. However, a photographic image obtained by image capturing is sometimes edited by image editing software to correct the focus position. At this time, the focus amount of each area in the image is also changed. In this case, image data after correction and a defocus amount after change may be used. Instead of obtaining a focus amount on the image capturing apparatus side, it is also possible to analyze a captured image by image editing software and obtain a focus amount by this analysis.

The data and information are not limited to them. For example, data of a photographic image created by modeling, rendering, image editing software, or the like, and information equivalent to a distance from the focal plane that is created by software corresponding to the image data edition can also be used. These software programs sometimes generate blur information of an image or the like using a map serving as information equivalent to a distance from the focal plane.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-025349, filed Feb. 15, 2018, and Japanese Patent Application No. 2018-222691, filed Nov. 28, 2018, which are hereby incorporated by reference herein in their entirety.

What is claimed is:

1. An image processing apparatus comprising:
an obtaining unit configured to obtain (1) an image processing condition for performing image processing to image data of an input photographic image, the image processing condition being set based on an output characteristic of an output apparatus, and (2) information equivalent to a distance from a focal plane in the input photographic image; and
an image processing unit configured to perform image processing to the image data based on the image processing condition and the information obtained by the obtaining unit,
wherein in the image processing by the image processing unit, a degree at which sharpness of an image output from the output apparatus when the distance from the focal plane that corresponds to the information is a first distance is controlled is higher than a degree at which the sharpness of the image output from the output apparatus when the distance from the focal plane that corresponds to the information is a second distance longer than the first distance is controlled, and
wherein the obtaining unit and the image processing unit are implemented by one or more processors.

2. The apparatus according to claim 1, wherein the obtaining unit obtains, as the information equivalent to the distance from the focal plane, at least one of a defocus amount corresponding to each of a plurality of pixels of the input photographic image represented by the image data, a distance from the focal plane to an object, and a parallax amount.

3. The apparatus according to claim 1, wherein the image processing by the image processing unit is processing for improving a three-dimensional appearance of the image output from the output apparatus.

4. The apparatus according to claim 1, wherein in the output characteristic, a degree of change of the sharpness differs depending on the distance represented by the information.

5. An image processing apparatus comprising:
an obtaining unit configured to obtain (1) an image processing condition for performing image processing to image data of an input photographic image, the image processing condition being set based on an output characteristic of an output apparatus, and (2) information equivalent to a distance from a focal plane in the input photographic image; and
an image processing unit configured to perform image processing to the image data based on the image processing condition and the information obtained by the obtaining unit,
wherein in the output characteristic, a degree of change of the sharpness in an area representing to be in focus at the distance represented by the information in the image data is larger than a degree of change of the sharpness in an area representing to be out of focus at the distance represented by the information, and wherein the obtaining unit and the image processing unit are implemented by one or more processors.

6. The apparatus according to claim 1, wherein the image processing unit performs, as image processing of controlling the sharpness, brightness conversion to increase a contrast of a brightness value represented by the image data in an acceptable in-focus area including an in-focus area in the input photographic image.

7. The apparatus according to claim 1, further comprising:
a calculation unit configured to calculate a Modulation Transfer Function characteristic as the output characteristic based on information obtained from a sample image; and
a derivation unit configured to derive the image processing condition based on the Modulation Transfer Function characteristic calculated by the calculation unit,
wherein the calculation unit and the derivation unit are implemented by one or more processors.

8. The apparatus according to claim 7, wherein the sample image is output from the output apparatus, and
wherein the information obtained from the sample image is obtained by measuring, by a measurement apparatus, the sample image output from the output apparatus.

9. The apparatus according to claim 8, wherein the sample image includes a plurality of images of different frequencies corresponding to the focal plane, and a plurality of images of different frequencies having a predetermined defocus amount.

10. The apparatus according to claim 7, wherein the sample image is generated by simulation, and the information obtained from the sample image is obtained from the sample image generated by the simulation.

11. The apparatus according to claim 10, wherein the sample image includes a plurality of images of different frequencies corresponding to the focal plane, and a plurality of images of different frequencies having a predetermined defocus amount.

12. The apparatus according to claim 1, wherein the image processing apparatus is included in a personal computer or the output apparatus.

13. The apparatus according to claim 1, wherein the input photographic image is obtained by image-capturing an object.

14. The apparatus according to claim 1, wherein the focal plane is a focal plane when image-capturing an object.

15. The apparatus according to claim 1, wherein the output apparatus is an inkjet printer configured to discharge ink to a print medium and to print an image.

16. A non-transitory computer-readable storage medium which stores a computer program to be executed in a processor of an image processing apparatus, the program when executed performing a method comprising:
obtaining (1) an image processing condition for performing image processing to image data of an input photographic image, the image processing condition being set based on an output characteristic of an output apparatus, and (2) information equivalent to a distance from a focal plane in the input photographic image; and
performing image processing to the image data based on the obtained image processing condition and the obtained information,
wherein in the image processing, a degree at which sharpness of an image output from the output apparatus when the distance from the focal plane that corresponds to the information is a first distance is controlled is higher than a degree at which the sharpness of the image when the distance from the focal plane that corresponds to the information is a second distance longer than the first distance is controlled.

17. An image processing method comprising:
obtaining (1) an image processing condition for performing image processing to image data of an input photographic image, the image processing condition being set based on an output characteristic of an output apparatus, and (2) information equivalent to a distance from a focal plane in the input photographic image; and
performing image processing to the image data based on the obtained image processing condition and the obtained information,
wherein in the image processing, a degree at which sharpness of an image output from the output apparatus when the distance from the focal plane that corresponds to the information is a first distance is controlled is higher than a degree at which the sharpness of the image when the distance from the focal plane that corresponds to the information is a second distance longer than the first distance is controlled.

18. The method according to claim 17, wherein in the obtaining, at least one of a defocus amount corresponding to each of a plurality of pixels of the input photographic image represented by the image data, a distance from the focal plane to an object, and a parallax amount is obtained as the information equivalent to the distance from the focal plane.

19. The method according to claim 17, wherein the image processing is processing for improving a three-dimensional appearance of the image output from the output apparatus.

20. An image processing apparatus comprising:
a setting unit configured to set an image processing condition for performing image processing to image data of an input photographic image based on an output characteristic of an output apparatus that influences sharpness of an image output from the output apparatus;
an obtaining unit configured to obtain information equivalent to a distance from a focal plane in the input photographic image; and
an image processing unit configured to perform image processing to the image data based on the information obtained by the obtaining unit and the image processing condition set by the setting unit, and to transfer to the output apparatus the image data to which the image processing was performed,
wherein the setting unit, the obtaining unit, and the image processing unit are implemented by one or more processors.

21. The apparatus according to claim 20, wherein the obtaining unit obtains, as the information equivalent to the distance from the focal plane, at least one of a defocus amount corresponding to each of a plurality of pixels of the input photographic image represented by the image data, a distance from the focal plane to an object, and a parallax amount.

22. The apparatus according to claim 20, wherein the image processing by the image processing unit is processing for improving a three-dimensional appearance of the image output from the output apparatus.

23. The apparatus according to claim 20, wherein in the output characteristic, a degree of change of the sharpness differs depending on the distance represented by the information.

24. The apparatus according to claim 20, wherein in the output characteristic, a degree of change of the sharpness in an area representing to be in focus at the distance represented by the information in the image data is larger than a degree of change of the sharpness in an area representing to be out of focus at the distance represented by the information.

25. The apparatus according to claim 20, wherein in the image processing by the image processing unit, a degree at which the sharpness of the image when the distance from the focal plane that corresponds to the information is a first distance is controlled is higher than a degree at which the sharpness of the image when the distance from the focal plane that corresponds to the information is a second distance longer than the first distance is controlled.

26. The apparatus according to claim 25, wherein the image processing unit performs, as image processing of controlling the sharpness, brightness conversion to increase a contrast of a brightness value represented by the image data in an acceptable in-focus area including an in-focus area in the input photographic image.

27. The apparatus according to claim 20, wherein the setting unit includes:
a calculation unit configured to calculate a Modulation Transfer Function characteristic as the output characteristic based on information obtained from a sample image; and
a derivation unit configured to derive the image processing condition based on the Modulation Transfer Function characteristic calculated by the calculation unit.

28. The apparatus according to claim 27, wherein the sample image is output from the output apparatus, and
wherein the information obtained from the sample image is obtained by measuring, by a measurement apparatus, the sample image output from the output apparatus.

29. The apparatus according to claim 28, wherein the sample image includes a plurality of images of different frequencies corresponding to the focal plane, and a plurality of images of different frequencies having a predetermined defocus amount.

30. The apparatus according to claim 27, wherein the sample image is generated by simulation, and
wherein the information obtained from the sample image is obtained from the sample image generated by the simulation.

31. The apparatus according to claim 20, wherein the sample image includes a plurality of images of different frequencies corresponding to the focal plane, and a plurality of images of different frequencies having a predetermined defocus amount.

32. The apparatus according to claim 20, wherein the image processing apparatus is included in a personal computer or the output apparatus.

33. The apparatus according to claim 20, wherein the input photographic image is obtained by image-capturing an object.

34. The apparatus according to claim 20, wherein the focal plane is a focal plane when image-capturing an object.

35. The apparatus according to claim 20, wherein the output apparatus is an inkjet printer configured to discharge ink to a print medium and to print an image.

36. A non-transitory computer-readable storage medium which stores a computer program to be executed in a processor of an image processing apparatus, the program when executed performing a method comprising:
setting an image processing condition for performing image processing to image data of an input photographic image based on an output characteristic of an output apparatus that influences sharpness of an image output from the output apparatus;
obtaining information equivalent to a distance from a focal plane in the input photographic image;
performing image processing to the image data based on the obtained information and the set image processing condition; and
transferring to the output apparatus the image data to which the image processing was performed.

37. An image processing method comprising:
setting an image processing condition for performing image processing to image data of an input photographic image based on an output characteristic of an output apparatus that influences sharpness of an image output from the output apparatus;
obtaining information equivalent to a distance from a focal plane in the input photographic image; and
performing image processing to the image data based on the obtained information and the set image processing condition; and
transferring to the output apparatus the image data to which the image processing was performed.

38. The method according to claim 37, wherein in the obtaining, at least one of a defocus amount corresponding to each of a plurality of pixels of the input photographic image represented by the image data, a distance from the focal plane to an object, and a parallax amount is obtained as the information equivalent to the distance from the focal plane.

39. The method according to claim 37, wherein the image processing is processing for improving a three-dimensional appearance of the image output from the output apparatus.

* * * * *